United States Patent

Del Fresno

[11] Patent Number: 5,121,678
[45] Date of Patent: Jun. 16, 1992

[54] EJECTOR GRATING FOR ELECTRIC TOASTER

[75] Inventor: Miguel L. Del Fresno, San Sebastian, Spain

[73] Assignee: Electrodomesticos Solac, S.A., Vitoria, Spain

[21] Appl. No.: 713,748

[22] Filed: Jun. 11, 1991

[30] Foreign Application Priority Data

Jun. 19, 1990 [ES] Spain .................................. 9001932

[51] Int. Cl.⁵ .............................................. A47J 37/08
[52] U.S. Cl. ........................................ 99/391; 99/393
[58] Field of Search ............... 99/329 P, 329 RT, 385, 99/389, 391, 393, 399

[56] References Cited

U.S. PATENT DOCUMENTS 3,880,063 4/1975 Pestka ................................ 99/329 R
3,986,444 10/1976 Caudron ............................... 99/391
4,972,768 11/1990 Basora San Juan ................... 99/391

FOREIGN PATENT DOCUMENTS 3045598 1/1982 Fed. Rep. of Germany .

Primary Examiner—Harvey C. Hornsby
Assistant Examiner—Reginald L. Alexander
Attorney, Agent, or Firm—Helfgott & Karas

[57] ABSTRACT

An ejector grating, which is fitted in a toaster, comprises two vertically travelling grids, each of which is dihedral and slightly obtuse in shape. The angles of the respective dihedrals each has a bar which passes through the end cover in a toaster general support and may travel vertically just as the grids along vertical slots provided in the end cover. The grids merge closer to each other at the upper edges thereof, as they move down into the general toaster support.

3 Claims, 1 Drawing Sheet

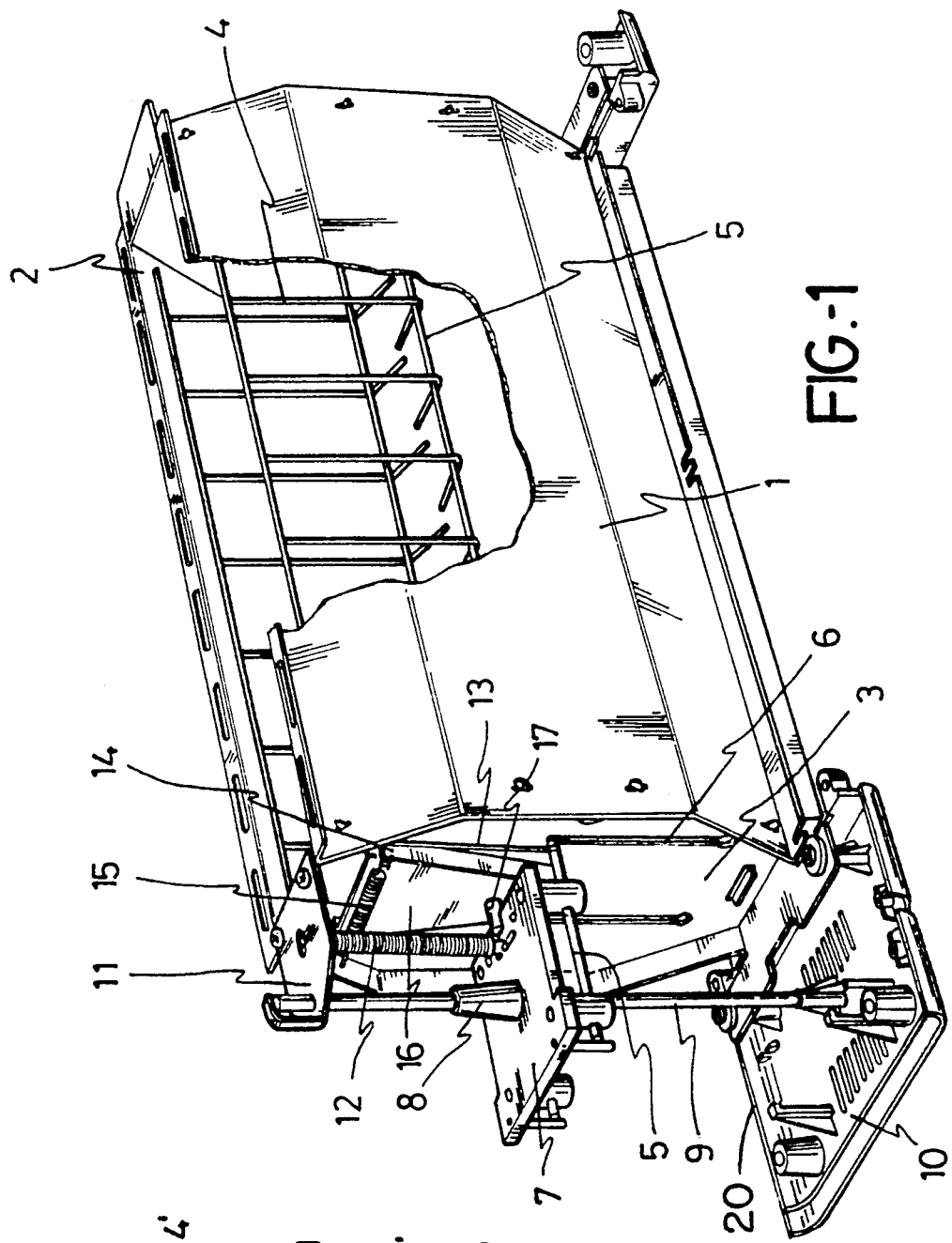
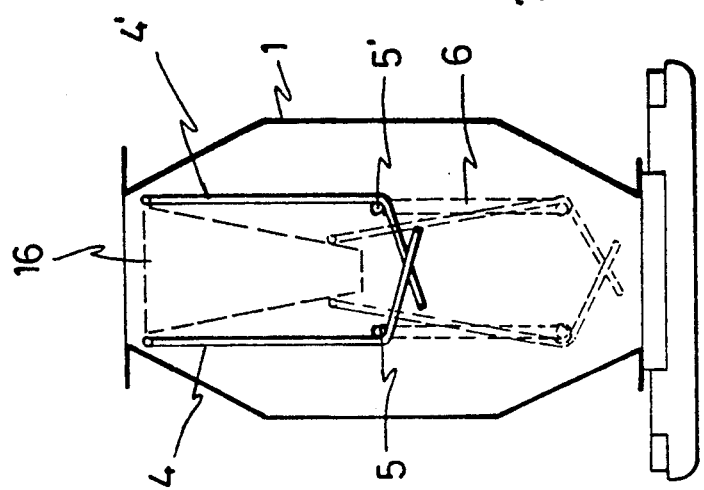

EJECTOR GRATING FOR ELECTRIC TOASTER

FIELD OF THE INVENTION

The present invention relates to a grating for an electric toaster, which grating fulfills its conventional purpose as such and acts as an ejector element for the pieces of toast, thereby to simplify the toaster's structure, and to provide an enhanced operative reliability.

BACKGROUND OF THE INVENTION

It is a known fact that household toasters are provided with an ornamental housing within which is fitted a support upon which two fixed grids or gratings are assembled, with the same number of resistors and reflective shields being located right outside, for a vertical space to be provided between both grids for insertion of the slice or slices to be toasted. The bottom of the toaster comprises an ejector plate having springs urging the same upwards and held in the lower position during toasting by an electric magnet acting upon a metal core provided on the ejector plate, the electric magnet's action ceasing for the plate to be released, once the set toasting time is up.

SUMMARY OF THE INVENTION

The ejector grating subject of the present invention, basically has the structure of a conventional electric toaster, allowing the ejector plate to be eliminated, with the grating as such acting as the ejector for the slices of toast.

More specifically, and in order to achieve the above, the lower end of each of the two grids making up the grating has a bar, after which such grids bend obtusely towards the other, the ends of such bars extending through the end walls of the toaster support, for such bars to play in slotted holes allowing a vertical displacement of the grating for the latter to fulfil its ejecting purpose.

At one of the ends thereof, the pair of bars in the two grids making up the grating, outside the support, are fixed to a support outside the toasting chamber, which support can slide vertically along a guide or column, with the assistance of a spring provided between the auxiliary support and the general toaster support, urging the former up, and having a metallic body in order for the classic electric magnet to act holding the same at the lower limiting toasting position.

Furthermore, as another characteristic of the invention, the two grids making up the grating gradually close upon each other as they move down, so that in the lower limiting position such grids clamp the slices to be toasted, such lateral swinging movement being attained due to the provision, by each of the aforesaid bars and right outside one of the general support's end walls, of a rising arm, bent at its free end that rests upon the relevant edge of an inverted isosceles trapezoidal slide, the arms in the two bars being related to each other by means of a transverse spring that tends to hold the bends in such arms in close contact with the side edges of the slide, thereby, as the grids go down, for their respective arms to swing closer, the grids undergo the gradual swinging movement in the direction of approximation therebetween.

The provision of a spigot has also been foreseen close to the lower end of the slide, blocking the downward displacement of the transverse spring when the grids are being lowered, thereby to further deform the spring at the terminal downward stage of the grating, to permit tight clamping of the grating around the slices to be toasted.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following:

FIG. 1 is a perspective view of an electric toaster, without its housing, but provided with the ejector grating, subject of the present invention; and FIG. 2 is a transverse sectional detail of the assembly of figure, showing the two limiting positions of the grating, the dotted line showing one of the wedge-like slides.

DESCRIPTION OF THE PREFERRED EMBODIMENT OF THE INVENTION

In light of these figures, it can be seen that an electric toaster with the ejector plate comprises, as any toaster of this sort, a grooved support (1), with a single or double opening at the top for insertion of the slices to be toasted, and with the ends closed by means of respective covers (3), designed to be housed and fitted within the relevant housing, that does not appear in the drawings, the lateral walls of this support (1) acting as reflective shields for two resistors provided right inside the same and that are obviously there to generate the heat required for the slices to be toasted, within the set time.

Now then, from this basic and conventional structure, the grating, subject of the invention, is essentially formed by two travelling grids (4–4'), each of which is dihedral and slightly obtuse in shape, as specifically shown in FIG. 2, a bar (5–5') being provided at the inner angle of the respective dihedrals, which bars pass through the end covers (3) in the toaster general support and may travel vertically, just like the grids, along vertically slotted holes (6) purposely provided in the covers (3).

While one of the ends of these bars (5) only projects from the cover (3) to the necessary extent for guiding thereof, the other does so considerably more to receive an auxiliary support (7) relating both bars (5–5"), as shown in FIG. 1, this auxiliary support (7) being provided with a neck (8) that is sufficiently wide as to ensure that the vertical displacement of the assembly is perfectly guided on a column (9) provided between the base (10) forming part of the housing and an upper wing (11) that in turn forms part of the general support, a spring (12) being moreover provided between this wing (11) and the auxiliary support (7) urging the grating to take up the upper limiting position outlined in FIG. 2 and represented by the upper end of the slotted hole (6) in the covers (3).

A metal body, that is not shown in the figures, is duly fixed to the auxiliary support (7), subject to the action of a classic electric magnet 20 schematically, shown in FIG. 1, in order to hold this travelling assembly in the lower limiting position, when the relevant external control lever is operated and for the set toasting time, at the end of which the electric magnet is energized and the auxiliary support (7) is free to move up the guide (9) taking with it the grids (4–4'), by action of the spring (12).

Furthermore, as another characteristic of the invention, and as is also shown in FIG. 2, the grids (4-4') making up the grating grow closer to each other at the upper ends thereof, as they move down into the general support (1), to which end the bars (5-5') are integrally provided at their outermost end and right outside the respective cover (3) with two radial arms (13) that point upwards, their upper and free end being bent (14), related to each other through a transverse spring (15) that urges the arms towards each other by swinging the arms and, hence, likewise causing the grids (4-4') to swing in the aforesaid direction of approximation. This approximation is checked by a slide (16) that is trapezoidal, isosceles and inverted in shape, its lateral edges supporting the aforesaid bends so that as the auxiliary support (7) moves down, the extent of approximation of the grids making up the grating increases.

Obviously, this gradual approximation of the arms (13) likewise causes the transverse spring (15) to be gradually shortened, and therefore at the end of the downward run, the tension in such spring is almost negligible. The provision of a spigot (17) in the slide (16) is foreseen to solve this problem, same obstructing downward displacement of the spring (15) causing this latter also to be deformed at the latter end of the run, thereby not only to recover the original spring tension, but increasing this latter, for the grids to be duly clamped to the slices to be toasted, at this lower limiting grating position.

When toasting comes to an end, and the electric magnet is deactivated, as is usually the case, the auxiliary support (7) is released and rises suddenly urged by the spring (12), as aforesaid, and on rising the grids (4-4') gradually swing open up to the top limiting position where they are fully open and where they have dragged the slices towards a position which is directly accessible by hand through the mouth of the toaster housing.

We feel that the device has now been described at sufficient length for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. An ejector grating in combination with a toaster having a base, a general support and two end covers, the grating comprising two dihedral-shaped, obtuse grids crossing each other at lower ends thereof to define a footing for supporting slices of articles being toasted, said grids being provided with respective elongated horizontal bars, each bar being positioned inside the respective grid at an angle formed by said dihedral, at least one of said end covers having two parallel vertical elongated slots each receiving the horizontal bar of the respective grid, each bar projecting outwardly of said one of the end covers, an auxiliary support, a vertical guide provided on said base, said auxiliary support vertically traveling on said guide under action of an electric magnet provided for holding said auxiliary support in a lower limiting position, said horizontal bars being secured to said auxiliary support to permit said grids to vertically travel therealong; and a vertical spring acting on said auxiliary support to urge said auxiliary support and said grids to a top limiting position thereof when the action of said electric magnet is terminated.

2. The grating according to claim 1, wherein said bars are provided at ends thereof extending outwardly of said end cover with two upwardly extending swingable arms positioned near said auxiliary support, said arms having top bent ends; and further comprising a traverse spring connected at two opposite ends thereof to said arms, and a trapezoidal-shaped slide, said bent ends resting upon edges of said trapezoidal-shaped slide, said traverse spring holding said bent ends in contact with said slide to permit said arms and thereby said grids to laterally swing in the directions towards and away from each other as said grids travel vertically down and up, respectively.

3. The grating according to claim 2, and further comprising a spigot provided on said slide for limiting a downward displacement of said traverse spring, as said bars with said arms vertically travel down, said spigot deforming said transverse spring at a lower position thereof, thereby increasing its tension to increase clamping of slices being toasted by said grids.

* * * * *